US012646070B2

(12) United States Patent
Naik et al.

(10) Patent No.: US 12,646,070 B2
(45) Date of Patent: Jun. 2, 2026

(54) METHODS AND SYSTEMS FOR PREVENTING A FRAUDULENT PAYMENT TRANSACTION

(71) Applicant: Mastercard International Incorporated, Purchase, NY (US)

(72) Inventors: Dattesh Naik, Pune (IN); Praveen Teragankar, Dharwad (IN); Ravi Pareek, Pune (IN)

(73) Assignee: Mastercard International Incorporated, Purchase, NY (US)

( * ) Notice: Subject to any disclaimer, the term of this patent is extended or adjusted under 35 U.S.C. 154(b) by 194 days.

(21) Appl. No.: 18/406,559

(22) Filed: Jan. 8, 2024

(65) Prior Publication Data

US 2024/0144281 A1 May 2, 2024

Related U.S. Application Data

(62) Division of application No. 17/173,998, filed on Feb. 11, 2021, now Pat. No. 11,907,953.

(30) Foreign Application Priority Data

Feb. 14, 2020 (IN) .............................. 202041006503

(51) Int. Cl.
| | |
|---|---|
| *G06Q 20/40* | (2012.01) |
| *G06Q 20/38* | (2012.01) |
| *H04L 9/08* | (2006.01) |

(52) U.S. Cl.
CPC ..... *G06Q 20/4016* (2013.01); *G06Q 20/3829* (2013.01); *H04L 9/085* (2013.01); *H04L 9/0866* (2013.01); *G06Q 2220/00* (2013.01)

(58) Field of Classification Search
CPC .................... G06Q 20/00–425; H04L 9/00–50
See application file for complete search history.

(56) References Cited

U.S. PATENT DOCUMENTS

| | | | | |
|---|---|---|---|---|
| 9,037,865 B1 * | 5/2015 | Gopalakrishna | ..... | G06Q 20/363 |
| | | | | 713/184 |
| 2017/0237554 A1 * | 8/2017 | Jacobs | .................... | G06F 21/64 |
| | | | | 713/171 |
| 2018/0232728 A1 * | 8/2018 | Dooley | ................ | G06Q 20/385 |

* cited by examiner

*Primary Examiner* — Ari Shahabi
(74) *Attorney, Agent, or Firm* — Hovey Williams LLP

(57) ABSTRACT

Embodiments provide methods and systems for preventing a fraudulent payment transaction. The method performed by issuer system associated with payment account of user includes generating unique data for payment transaction of the user upon approval of payment transaction authorization request signal. The method includes facilitating encryption of the unique data based on encryption key and sending payment transaction authorization response signal to payment server associated with payment network. The payment transaction authorization response signal includes at least the encrypted unique data. The method includes processing the payment transaction upon receiving a notification of a successful validation of the payment transaction authorization response signal from payment server. The validation of the payment transaction authorization response signal is performed by payment server. For validation, payment server decrypts unique data received in payment transaction authorization response and determines match between decrypted unique data and payment data associated with payment transaction authorization request signal.

13 Claims, 12 Drawing Sheets

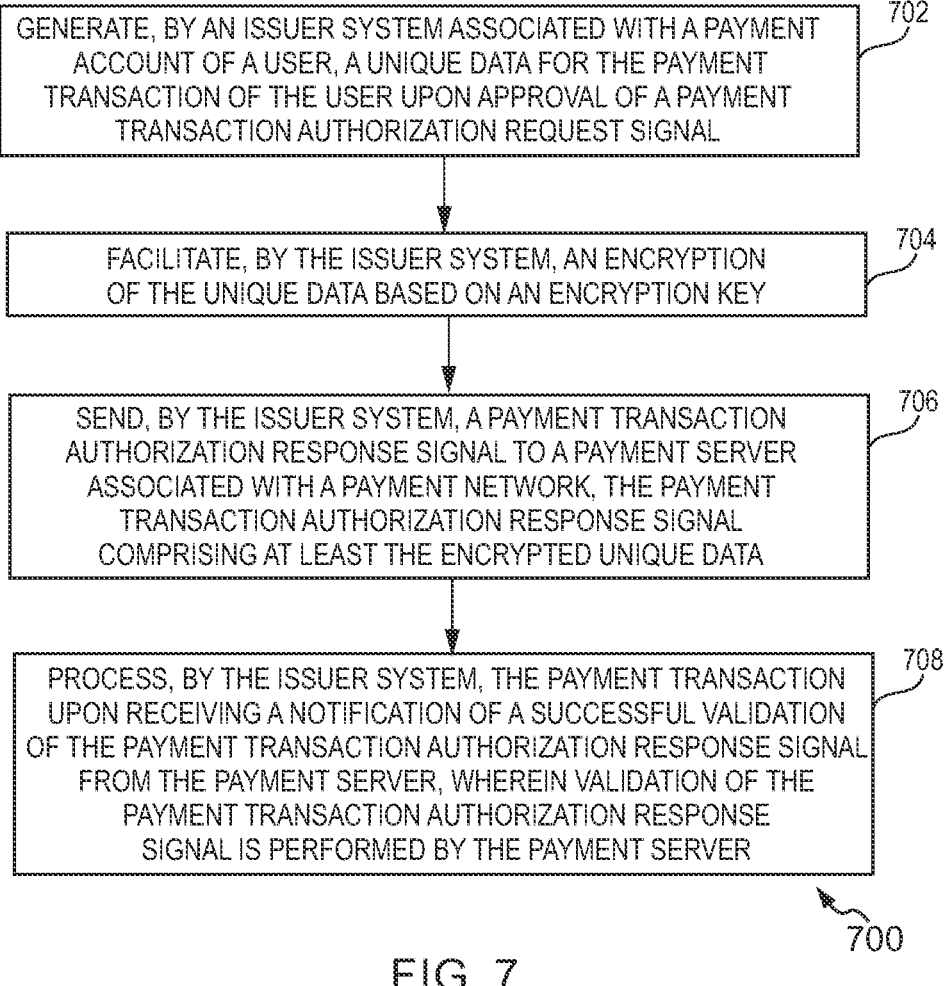

GENERATE, BY AN ISSUER SYSTEM ASSOCIATED WITH A PAYMENT ACCOUNT OF A USER, A UNIQUE DATA FOR THE PAYMENT TRANSACTION OF THE USER UPON APPROVAL OF A PAYMENT TRANSACTION AUTHORIZATION REQUEST SIGNAL — 702

FACILITATE, BY THE ISSUER SYSTEM, AN ENCRYPTION OF THE UNIQUE DATA BASED ON AN ENCRYPTION KEY — 704

SEND, BY THE ISSUER SYSTEM, A PAYMENT TRANSACTION AUTHORIZATION RESPONSE SIGNAL TO A PAYMENT SERVER ASSOCIATED WITH A PAYMENT NETWORK, THE PAYMENT TRANSACTION AUTHORIZATION RESPONSE SIGNAL COMPRISING AT LEAST THE ENCRYPTED UNIQUE DATA — 706

PROCESS, BY THE ISSUER SYSTEM, THE PAYMENT TRANSACTION UPON RECEIVING A NOTIFICATION OF A SUCCESSFUL VALIDATION OF THE PAYMENT TRANSACTION AUTHORIZATION RESPONSE SIGNAL FROM THE PAYMENT SERVER, WHEREIN VALIDATION OF THE PAYMENT TRANSACTION AUTHORIZATION RESPONSE SIGNAL IS PERFORMED BY THE PAYMENT SERVER — 708

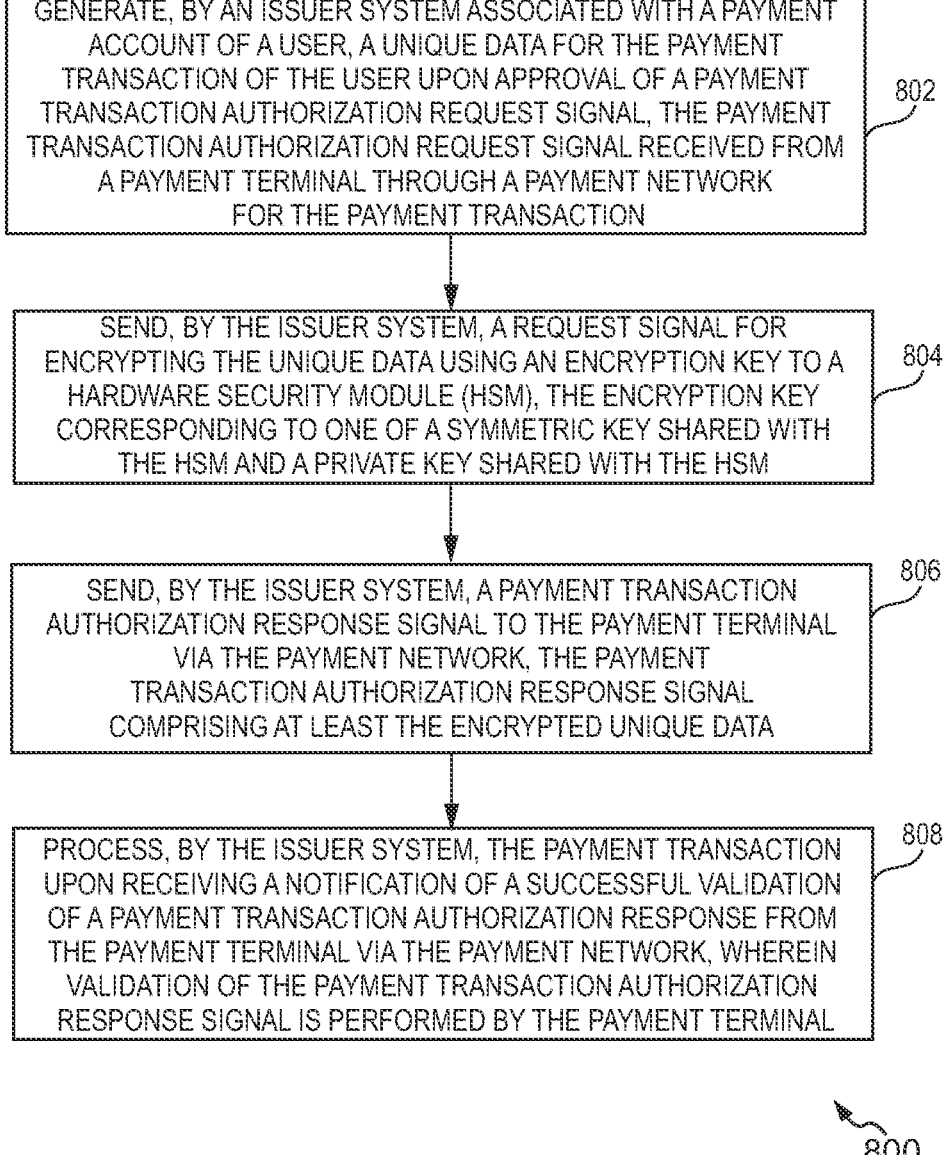

GENERATE, BY AN ISSUER SYSTEM ASSOCIATED WITH A PAYMENT ACCOUNT OF A USER, A UNIQUE DATA FOR THE PAYMENT TRANSACTION OF THE USER UPON APPROVAL OF A PAYMENT TRANSACTION AUTHORIZATION REQUEST SIGNAL, THE PAYMENT TRANSACTION AUTHORIZATION REQUEST SIGNAL RECEIVED FROM A PAYMENT TERMINAL THROUGH A PAYMENT NETWORK FOR THE PAYMENT TRANSACTION ⟋ 802

SEND, BY THE ISSUER SYSTEM, A REQUEST SIGNAL FOR ENCRYPTING THE UNIQUE DATA USING AN ENCRYPTION KEY TO A HARDWARE SECURITY MODULE (HSM), THE ENCRYPTION KEY CORRESPONDING TO ONE OF A SYMMETRIC KEY SHARED WITH THE HSM AND A PRIVATE KEY SHARED WITH THE HSM ⟋ 804

SEND, BY THE ISSUER SYSTEM, A PAYMENT TRANSACTION AUTHORIZATION RESPONSE SIGNAL TO THE PAYMENT TERMINAL VIA THE PAYMENT NETWORK, THE PAYMENT TRANSACTION AUTHORIZATION RESPONSE SIGNAL COMPRISING AT LEAST THE ENCRYPTED UNIQUE DATA ⟋ 806

PROCESS, BY THE ISSUER SYSTEM, THE PAYMENT TRANSACTION UPON RECEIVING A NOTIFICATION OF A SUCCESSFUL VALIDATION OF A PAYMENT TRANSACTION AUTHORIZATION RESPONSE FROM THE PAYMENT TERMINAL VIA THE PAYMENT NETWORK, WHEREIN VALIDATION OF THE PAYMENT TRANSACTION AUTHORIZATION RESPONSE SIGNAL IS PERFORMED BY THE PAYMENT TERMINAL ⟋ 808

PROCESSING
MODULE
1202

COMMUNICATION
MODULE
1206

MEMORY
MODULE 1204

PAYMENT CARD
READER
1208

STORAGE
MODULE
1210

AUTHENTICATION
MODULE 1212

INPUT / OUTPUT
MODULE
1214

1200

METHODS AND SYSTEMS FOR PREVENTING A FRAUDULENT PAYMENT TRANSACTION

CROSS REFERENCE TO RELATED APPLICATIONS

This is a divisional application of U.S. patent application Ser. No. 17/173,998, filed Feb. 11, 2021, and titled METH-ODS AND SYSTEMS FOR PREVENTING A FRAUDU-LENT PAYMENT TRANSACTION, which itself claims priority to Indian Application No. 202041006503, filed Feb. 14, 2020. Each of the listed earlier-filed applications is incorporated herein by reference in its entirety.

TECHNICAL FIELD

The present disclosure generally relates to a payment technology and, more particularly to, methods and systems for preventing a fraudulent payment transaction.

BACKGROUND

Nowadays, digital or chip-based payments through use of smart cards, smart phones or the like have become popular among many users. A smart card may include microcon-trollers or integrated chips (ICs) that are embedded in payment cards of the users. These ICs are used to secure storage of sensitive data of the users as well as secure the payment transactions. Typically, cryptographic means and protocols may be implemented to provide security controls and communications over the payment transactions. How-ever, there may be vulnerable attacks that may intercept the communications. Such vulnerable attacks may lead to fraud payment transactions.

Fraudsters may bypass actual payment processor opera-tions and receive approvals from an issuer through malware means. The malware may be used to compromise the payment processing switch of the issuer. For instance, an automated-teller machine (ATM) displays error messages, such as ATM cash-out, when a user withdraws money from the ATM. A fraudster may leverage the malware to control fraud transactions at the ATM. Typically, a malware running in a compromised switch server inspects inbound financial messages with specific identifier, such as a primary account number (PAN) of a user. If a transaction message contains a pre-identified PAN, then the server switch processes the transaction message and routes appropriately to the issuer. After receiving the transaction amount, the malware deletes transaction log, which increases difficulty in detecting the fraud transaction.

Therefore, there exists a need to provide a technical solution that would overcome the above-mentioned prob-lems. It would be advantageous to prevent a fraudulent payment transaction in a feasible and efficient manner.

SUMMARY

Various embodiments of the present disclosure provide systems and methods for performing a payment transaction based on validating a payment transaction authorization response.

In an embodiment, a computer-implemented method for performing a payment transaction, is disclosed. The com-puter-implemented method includes generating, by an issuer system associated with a payment account of a user, a unique data for the payment transaction of the user upon approval of a payment transaction authorization request signal. The computer-implemented method includes facilitating, by the issuer system, an encryption of the unique data based on an encryption key. The computer-implemented method includes sending, by the issuer system, a payment transac-tion authorization response signal to a payment server associated with a payment network. The payment transac-tion authorization response signal includes at least the encrypted unique data. The computer-implemented method includes processing, by the issuer system, the payment transaction upon receiving a notification of a successful validation of the payment transaction authorization response signal from the payment server. The validation of the payment transaction authorization response signal is per-formed by the payment server.

In another embodiment, an issuer system associated with a payment account of a user for performing a payment transaction is disclosed. The issuer system includes a memory and a processor. The memory includes stored instructions. The processor is configured to execute the stored instructions to cause the issuer system to perform at least in part to generate a unique data for the payment transaction of the user upon approval of a payment trans-action authorization request signal. The issuer system is caused to perform at least in part to facilitate an encryption of the unique data based on an encryption key and send a payment transaction authorization response signal to a pay-ment server associated with a payment network. The pay-ment transaction authorization response signal includes at least the encrypted unique data. The issuer system is caused to perform at least in part to process the payment transaction upon receiving a notification of a successful validation of the payment transaction authorization response signal from the payment server. The validation of the payment transaction authorization response signal is performed by the payment server.

In yet another embodiment, a computer-implemented method for performing a payment transaction is disclosed. The computer-implemented method includes generating, by an issuer system associated with a payment account of a user, a unique data for the payment transaction of the user upon approval of a payment transaction authorization request signal. The payment transaction authorization request signal is received from a payment terminal through a payment network for the payment transaction. The com-puter-implemented method includes sending, by the issuer system, a request signal for encrypting the unique data using an encryption key to a hardware security module (HSM). The HSM thereafter encrypts the unique data using an encryption key. The encryption key corresponds to one of a symmetric key shared with the HSM and a private key shared with the HSM. The computer-implemented method includes sending, by the issuer system, a payment transac-tion authorization response signal to the payment terminal via the payment network. The payment transaction authori-zation response signal includes at least the encrypted unique data. The computer-implemented method further includes processing, by the issuer system, the payment transaction upon receiving a notification of a successful validation of a payment transaction authorization response from the pay-ment terminal via the payment network. The validation of the payment transaction authorization response signal is performed by the payment terminal.

Other aspects and example embodiments are provided in the drawings and the detailed description that follows.

BRIEF DESCRIPTION OF THE FIGURES

For a more complete understanding of example embodi-ments of the present technology, reference is now made to the following descriptions taken in connection with the accompanying drawings in which:

FIG. 7 is a flow diagram depicting a method for performing a payment transaction based on validating a payment transaction authorization response, in accordance with an example embodiment of the present disclosure;

FIG. 8 is a flow diagram depicting a method for performing a payment transaction based on validation of the payment transaction authorization response, in accordance with another example embodiment of the present disclosure;

Figure 1:
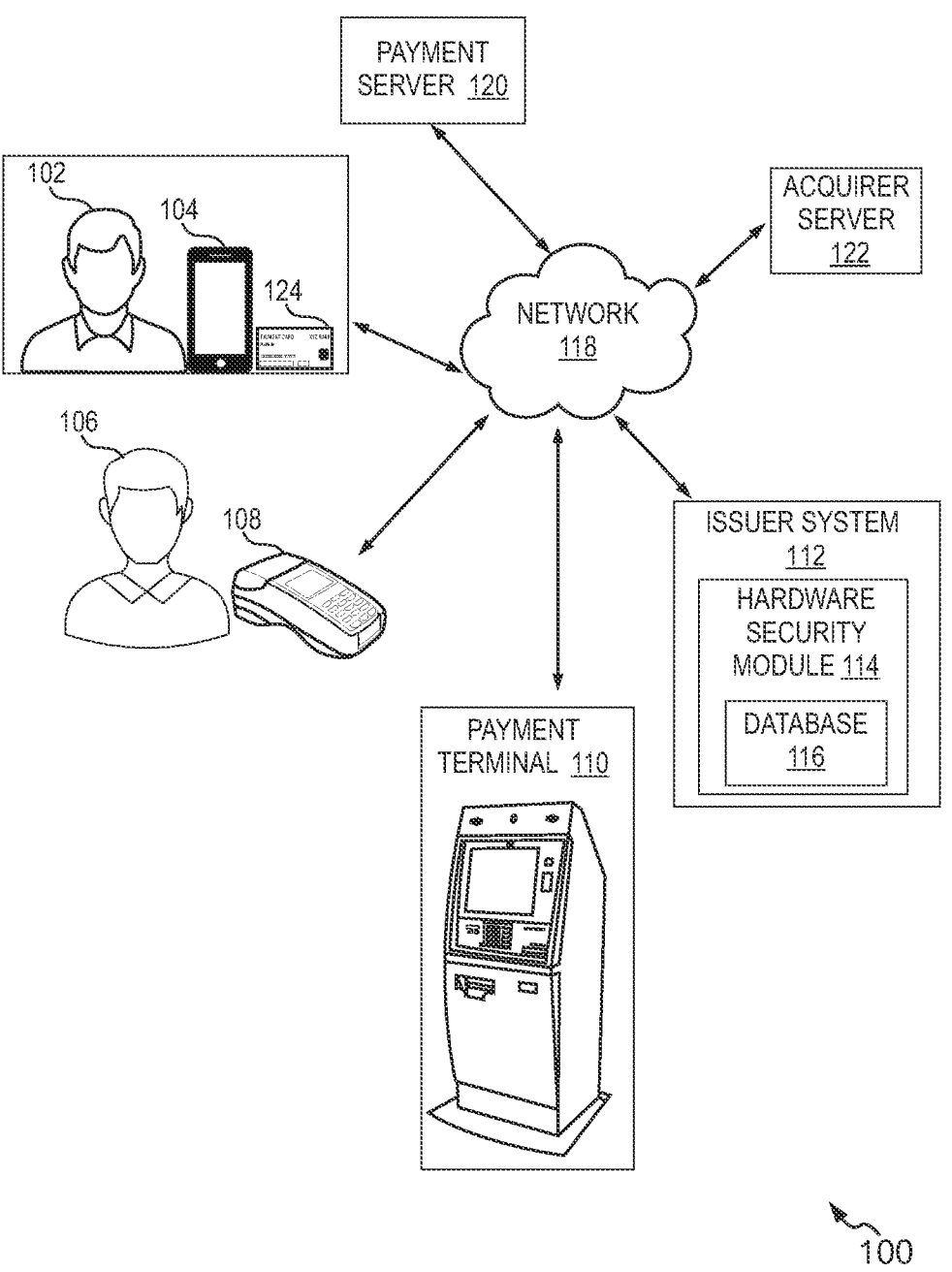
FIG. 1 illustrates an example representation of an environment related to at least some example embodiments of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

The term "payment account" used throughout the description refers to a financial account that is used to fund the financial transaction (interchangeably referred to as "payment transaction"). Examples of the payment account include, but are not limited to a savings account, a credit account, a checking account and a virtual payment account. The payment account may be associated with an entity such as an individual person, a family, a commercial entity, a company, a corporation, a governmental entity, a non-profit organization and the like. In some scenarios, a payment account may be a virtual or temporary payment account that can be mapped or linked to a primary payment account, such as those accounts managed by payment wallet service providers.

The term "payment card", used throughout the description, refers to a physical or virtual card linked with a financial or payment account that may be presented to a merchant or any such facility in order to fund a financial transaction via the associated payment account. Examples of the payment card include, but are not limited to, debit cards, credit cards, prepaid cards, virtual payment numbers, virtual card numbers, forex cards, charge cards, e-wallet cards, and stored-value cards. A payment card may be a physical card that may be presented to the merchant for funding the payment. Alternatively or additionally, the payment card may be embodied in form of data stored in a user device, where the data is associated with payment account such that the data can be used to process the financial transaction between the payment account and a merchant's financial account.

The term "payment network", used throughout the description, refers to a network or collection of systems used for transfer of funds through use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by various payment interchange networks such as Mastercard®.

Overview

Various example embodiments of the present disclosure provide systems and methods for performing a payment transaction based on validating a payment transaction authorization response that overcomes above-mentioned obstacles and provides additional advantages. More specifically, techniques disclosed herein authenticate whether the payment transaction authorization response is from a valid issuer of a user. If the issuer is valid, then the payment transaction is processed. In case, the issuer is not valid, then the payment transaction is declined.

In an illustrative example scenario, a payment transaction authorization request for a payment transaction of a user is sent to an issuer system of the user via a payment network. In one example, the payment transaction authorization request is generated by a payment terminal when the user performs a payment transaction using a payment card on the payment terminal. The payment terminal used herein includes a merchant terminal/Point-of-sale (POS) terminal, an automated-teller machine (ATM), a credit card terminal or any terminal that can read a payment card of the user and performs the payment transaction.

The payment transaction authorization request includes payment data corresponding to the payment transaction, such as a transaction amount, a transaction time information or any data related to the payment transaction. The issuer system determines authenticity of the payment transaction authorization request. After a successful authentication of the payment transaction authorization request, the issuer system generates a unique data using the payment data. In one example embodiment, the unique data includes, but is not limited to, a transaction amount data, a transaction time data, a transaction date data, card expiration date data, and authorization response code data.

After the generation of the unique data, a request for encrypting the unique data is sent to a hardware security module (HSM). The HSM used herein is a hardware device used by financial institutions to store, maintain and manage cryptographic keys and other authentication related data for safeguarding information of users and for providing security in payment transactions. The HSM encrypts the unique data using an encryption key.

In one case, the encryption key corresponds to a symmetric key that is shared among the HSM, the issuer system and a payment server. In another case, the HSM encrypts the unique data using a private key of the issuer system. The encrypted unique data are sent to the issuer system.

The issuer system initiates a payment transaction authorization response upon receipt of the encrypted unique data and sends the payment transaction authorization response to the payment network. The payment transaction authorization response is sent to the payment network. The payment transaction authorization response may include, but not limited to, the encrypted unique data.

In one example embodiment, the payment server associated with the payment network is configured to validate the payment transaction authorization response. The payment server is configured to decrypt the encrypted unique data included in the payment transaction authorization response using a decryption key. The decryption key is the symmetric key shared by the issuer system. After the decryption, the payment server is configured to match the decrypted unique data with the payment data (received in the payment transaction authorization request). The payment server is configured to determine the issuer system as a valid issuer based on a successful match and send a notification of a successful validation of the payment transaction authorization response to the issuer system. The issuer system processes the payment transaction upon receiving the notification.

In another example embodiment, the payment transaction authorization response is validated by the payment terminal. The payment transaction authorization response is provided to the payment terminal via the payment network. The payment terminal accesses the encrypted unique data from the payment transaction authorization response. The encrypted unique data is decrypted by the payment terminal using a public key of the issuer system. The public key is read from the payment card of the user, when the payment card is dipped or tapped at the payment terminal. After the decryption, the payment terminal verifies matching of the decrypted unique data with the payment data. If the decrypted unique data matches with the payment data, the payment transaction authorization response is validated. After successful validation, the payment terminal determines that the issuer system is a valid issuer. A notification of the successful validation of the payment transaction authorization response is sent to the issuer system by the payment terminal. The issuer system then processes the payment transaction.

In one case, if the decrypted unique data does not match with the payment data, the payment transaction authorization response is not validated. In other words, it is understood that the payment transaction authorization response is not received from a valid issuer. In such case, the payment transaction is declined upon non-validation of the payment transaction authorization response. The payment terminal sends an alert notification to the issuer system for declining the payment transaction.

Thus, the payment transaction is processed based on validating the payment transaction authorization response, thereby preventing processing of fraudulent payment transactions.

Various example embodiments of present disclosure are described hereinafter with reference to FIGS. 1 to 12.

FIG. 1 illustrates an example representation of an environment 100 related to at least some example embodiments of the present disclosure. The environment 100 is depicted to include a user 102 associated with a user device 104. In one example, the user 102 presents his/her payment card at a payment terminal of a merchant for purchasing goods or services. In another example, the user 102 presents the payment card 124 at a payment terminal for cash money withdrawal.

In one embodiment, the user may utilize the user device 104 for payment transactions. The user device 104 may be a smartphone, a computer, a laptop, a tablet or the like. In an example embodiment, the user device 104 may be equipped with an instance of a payment application installed therein (not shown in FIG. 1). It must be noted that the term 'payment application' is interchangeably referred to as 'application' throughout the disclosure. The user device 104 can communicate through a payment gateway server, with a payment server 120 or any other payment related server/ system, such as an issuer system 112, an acquirer server 122, or the like. The application is a set of computer executable codes configured to communicate with the payment gateway server. The set of computer executable codes may be stored in a non-transitory computer-readable medium of the user device 104. The application may be a mobile application or a web application.

The environment 100 is further depicted to include a payment terminal 110. The payment terminal 110 may be, but not limited to, a Point-of-Sale (POS) terminal, an online payment gateway, a merchant computer, an Automatic Teller Machine (ATM) terminal, a credit card terminal or any terminal equipped with a payment card reader for payment transactions etc. The payment terminal 110 is configured to access card details associated with the payment card 124. In an illustrative example scenario, a merchant 106 is associated with a merchant terminal/POS terminal 108. Examples of the merchant 106 may include any retail shop, restaurant, supermarket or establishment, government and/or private agencies, or any such place equipped with POS terminals, such as the merchant terminal 108 where customers visit for performing financial transaction in exchange for any goods and/or services or any transaction that requires financial transaction between customers and the merchant 106.

The merchant terminal 108 may be associated with a merchant device (not shown in FIG. 1). The merchant device may be a mobile phone, a computer device, a laptop, a personal digital assistant (PDA) or any electronic computing device. The merchant terminal 108 and the payment terminal 110 are capable of performing a card or a contactless card based payment transaction. It shall be noted that the merchant terminal 108 and the payment terminal 110 herein may include a POS machine which is used to read payment cards. To accept payment transactions from customers, such as the user 102, the merchant 106 must normally establish an account with a financial institution that is part of the financial payment system. This financial institution is usually called the "merchant bank" or the "acquiring bank" or "acquirer bank" or simply "acquirer". The acquirer server 122 is associated with a financial institution normally called as a "merchant bank" or an "acquiring bank" or an "acquirer bank" or simply an "acquirer", in which the merchant 106 or the service provider entities may have an account. For instance, the transaction amount is settled between a payment account of the user 102 and the acquirer account of the merchant 106. It shall be noted that the terms, "issuer bank" or "issuing bank" or simply "issuer", indicate a bank in which the user 102 has the payment account and the issuer bank issues the payment card 124, such as a credit card or a debit card, to the user 102. The user 102 uses the payment card 124 at the merchant terminal 108 to tender a payment transaction. The payment card 124 may interact with the payment terminal 110 (e.g., a point-of-sale (POS) terminal) in order to initiate the processing of a transaction. The payment card 124 may have the payment account information encoded (or otherwise contained) on the payment card 124, which may be accessible to the payment terminal 110. The account information may be encoded or contained on the payment card 124 through any suitable method such as in form of chip, or as magnetic storage. Further, the payment card 124 may include any suitable element, component, or mechanism for initiating a payment transaction. For example, the payment card 124 may have a magnetic stripe, near-field communication (NFC) element, security cards, access cards, 2-D barcodes, or any other communication components to transfer information to the payment terminal 110.

In one embodiment, the user 102 enters payment card details on the user device 104 for performing a payment transaction to a merchant, such as the merchant 106 through the payment application. The user device 104 communicates with the payment gateway server (not shown in figures) and the payment gateway server initiates a payment transaction authorization request and sends the payment transaction authorization request to the acquirer server 122.

Examples of the payment network 118 include, but not limited to, Mastercard® payment system interchange network 118. The Mastercard® payment system interchange network 118 is a proprietary communications standard promulgated by Mastercard International Incorporated® for the exchange of financial transaction data among the financial institutions that are members of Mastercard International Incorporated®. (Mastercard is a registered trademark of Mastercard International Incorporated located in Purchase, N.Y.). The payment card system interchange network 118 is hereinafter referred to as the payment network 118. Simultaneously or subsequently, the issuer system 112 debits funds equal in amount to the transaction amount from the issuer account of the user 102. The payment is passed to a merchant account of the merchant 106 to complete the payment transaction. In some cases, the payment network 118 may be connected to a communication network (not shown in FIG. 1) that includes wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or Zigbee networks, and the like. An example of the combination of wired and wireless networks may include the Internet.

In one embodiment, when the user 102 visits the merchant 106, the user 102 provides the payment card 124 to the merchant 106 for a payment transaction of purchased items. The merchant 106 dips or taps the payment card 124 at the merchant terminal 108. The merchant terminal 108 communicates with the acquirer server 122. The acquirer server 122 may initiate the payment transaction by communicating with the payment server 120 via the payment network 118. The payment server 120 sends a payment transaction authorization request to the issuer system 112. In another example scenario, the user 102 may dip or tap a payment card at the payment terminal 110 (e.g., "ATM terminal") for withdrawing a payment amount, such as 50000/−. In such scenario, an acquirer server (e.g., the acquirer server 122) associated with the payment terminal 110 initiates the payment transaction.

The issuer system 112 determines authenticity of the payment transaction authorization request. After approving the payment transaction authorization request, the issuer system 112 accesses payment data from the payment transaction authorization request. The payment data includes details corresponding to the payment transaction. The issuer system 112 generates a unique data based on the payment data. In an example embodiment, the unique data includes, but is not limited to, a transaction amount data, a transaction time data, a transaction date data, card expiration date data, and authorization response code data. The unique data is further explained in FIG. 2.

After generating the unique data, the issuer system 112 communicates with a hardware security module, such as the HSM 114. In an example embodiment, the HSM 114 may be integrated within the issuer system 112. In another example embodiment, the HSM 114 may be an external device that is plugged-in to the issuer system 112. The HSM 114 receives a request from the issuer system 112 to encrypting the unique data for the payment transaction. The issuer system 112 sends the unique data to the HSM 114 along with the request. The HSM 114 accesses an encryption key for encrypting the unique data. The encryption key may be stored in a database, such as a database 116. The database 116 may be integrated within the HSM 114 or may be operatively communicable with the issuer system 112. The HSM 114 accesses the encryption key from the database 116. In one embodiment, the encryption key is stored within the HSM 114. In an example embodiment, the encryption key is a symmetric key shared by the issuer system 112 to the HSM 114. The symmetric key is also shared with the payment server 120 by the issuer system 112. In another example embodiment, the encryption key is a private key of the issuer system 112. The unique data is encrypted by the HSM 114 using the encryption key.

Thereafter, the encrypted unique data is sent to the issuer system 112 and the issuer system 112 generates and sends a payment transaction authorization response to the payment network 118. The payment transaction authorization response includes, but is not limited to, the encrypted unique data and an approval response message. In one example embodiment, the issuer system 112 sends the payment transaction authorization response to the payment server 120. After receiving the payment transaction authorization response, the payment server 120 accesses the encrypted unique data and decrypts the encrypted unique data using a decryption key. In one example, the decryption key corresponds to the symmetric key shared by the issuer system 112. The encrypted unique data is decrypted using the symmetric key. The decrypted unique data is compared with the payment data that was used in sending the payment transaction authorization request by the payment server 120. The payment server 120 determines matching data elements between the decrypted unique data and the payment data based on the comparison. When the data elements are determined to be matched, the payment server 120 confirms that the payment transaction authorization response is provided by a valid issuer, i.e., issuer system 112. After successful validation, the issuer system 112 is notified to complete the payment transaction. The issuer system 112 deducts the transaction amount from a payment account of the user 102. The deducted transaction amount is provided to the payment server 120 to further provide to the acquirer server 122. In one example, if the data elements are determined to be mismatched, the payment server 120 confirms that the payment transaction authorization response is received from a fraudulent system/invalid issuer. In such case, the payment server 120 is configured to decline or cancel the payment transaction.

In another example embodiment, the payment transaction authorization response is validated by the merchant terminal 108 or the payment terminal 110. In an illustrative example scenario, a user, such as the user 102 dips or taps the payment card 124 at the payment terminal 110. When the payment card 124 is dipped or tapped, the payment terminal 110 reads a public key stored in the payment card 124. In an example embodiment, the public data may reside in a secure chip embedded in the payment card 124. The public key is thereafter stored in the payment terminal 110. The user 102 enters a password, such as a PIN at the payment terminal 110. After the PIN is provided, the payment terminal 110 communicates with a bank server, such as the acquirer server 122. The acquirer server 122 may communicate with the issuer system 112 via the payment network 118 for the payment transaction.

The payment terminal 110 sends the payment transaction authorization request to the issuer system 112 via the payment network 118. The payment transaction authorization request may include, but not limited to, transaction account, transaction time, issuer identifier, transaction date, card expiration date, passwords etc. The payment transaction authorization request may comply with a message type defined by an International Organization for Standardization (ISO) 8583 standard, which is a standard for systems that exchange electronic transaction information associated with payments made by users using the payment card, or the payment account. In one example, the payment transaction authorization request includes a plurality of data elements, which conforms to follow contents and formats as defined in Customer Interface Specification (CIS) specification for authorization messages.

The issuer system 112 provides the payment transaction authorization response to the payment terminal 110 in response to successful authentication of the payment transaction authorization request. The payment transaction authorization response includes an encrypted unique data, which may include payment data in an encrypted form. The payment terminal 110 accesses the public key. The encrypted unique data is decrypted using the public key. Further, the payment terminal 110 validates the payment transaction authorization response by matching data elements between the decrypted unique data and the payment data. If there is a match, the payment terminal 110 confirms that the payment transaction authorization response is from a valid issuer system 112. The payment terminal 110 notifies the issuer system 112 to process the payment transaction. In case, the payment terminal 110 determines that there is no match, the payment terminal 110 infers that the payment transaction authorization response is from a fraudulent system/sender impersonating as the issuer system 112. Further, the payment terminal 110 sends an alert notification to the issuer system 112 to decline the payment transaction.

Thus, the payment transaction is executed based on determining if the payment transaction authorization response is from a valid issuer. Moreover, a fraudulent payment transaction is prevented when the payment transaction authorization response is not validated. Further, some non-exhaustive example embodiments of performing the payment transaction based on validating the payment transaction authorization response, are described with reference to FIGS. 2 to 12.

Figure 2:
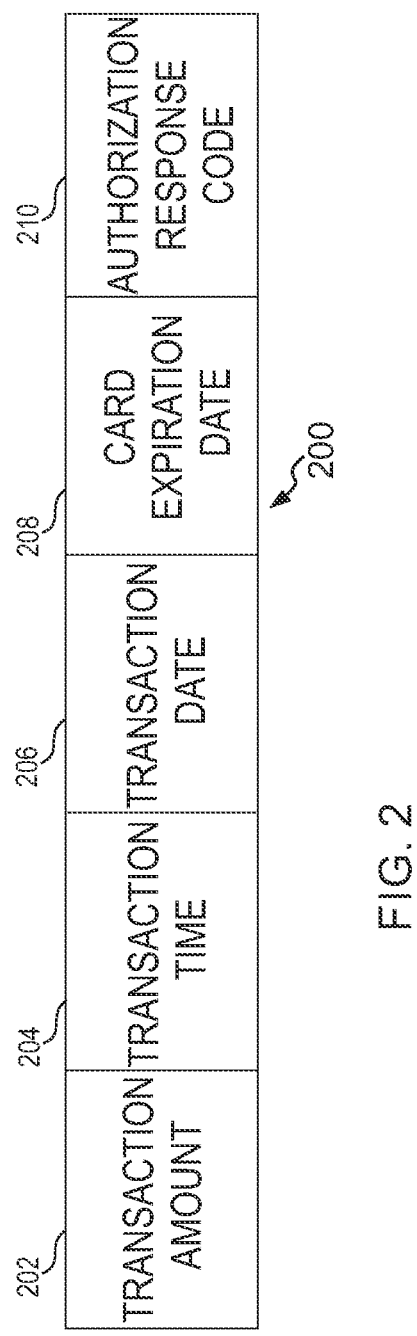
FIG. 2 shows an example representation of a unique data generated by an issuer system, in accordance with an example embodiment of the present disclosure.

FIG. 2 shows an example representation of a unique data 200 generated by an issuer system 112, in accordance with an example embodiment of the present disclosure. The unique data 200 is shown and described herein as an example data format and this does not limit the scope of the present disclosure. As mentioned in FIG. 1, the unique data 200 is generated by the issuer system 112 of FIG. 1 based on the payment data in the payment transaction authorization request. The unique data 200 is depicted to include a data field 202, a data field 204, a data field 206, a data field 208, and a data field 210. The data fields 202, 204, 206, and 208 may correspond to payment data received in the payment transaction authorization request message.

The data field 202 represents a transaction amount requested by the user 102. The data field 202 may define the transaction amount in a local currency of the acquirer server 122 or based on a source location from where the payment transaction is initiated. The data field 204 corresponds to a transaction time (e.g., hour, minutes and seconds in HH:MM:SS format) at which the payment transaction takes place at the payment terminal 110. The data field 206 corresponds to a transaction date (e.g., month and date in MMDD) on which the payment transaction takes place at the payment terminal 110. The data field 208 corresponds to card expiration date that specifies year and month after which the payment card 124 of the user 102 is designated to be expired by the issuer, i.e., the issuer system 112. The expiration date may be in a format of YYMM. It shall be noted that the transaction time, transaction date and card expiration date in corresponding data fields 204, 206 and 208 may be specified in time zone units of a local time and may not be in time units of a universal time. The data field 210 includes authorization response code data indicating authentication response of the payment transaction authorization request determined by the issuer system 112.

The unique data 200 is encrypted by the HSM 114 using an encryption key shared with the issuer system 112. The payment transaction authorization response is sent to the payment network 118. The payment transaction authorization response may include, but not limited to, the encrypted unique data. In one example embodiment, the payment transaction authorization response is validated by the payment server 120. The payment transaction is then processed upon successful validation of the payment transaction authorization response using the unique data 200, which is explained next with reference to FIG. 3.

Figure 3:
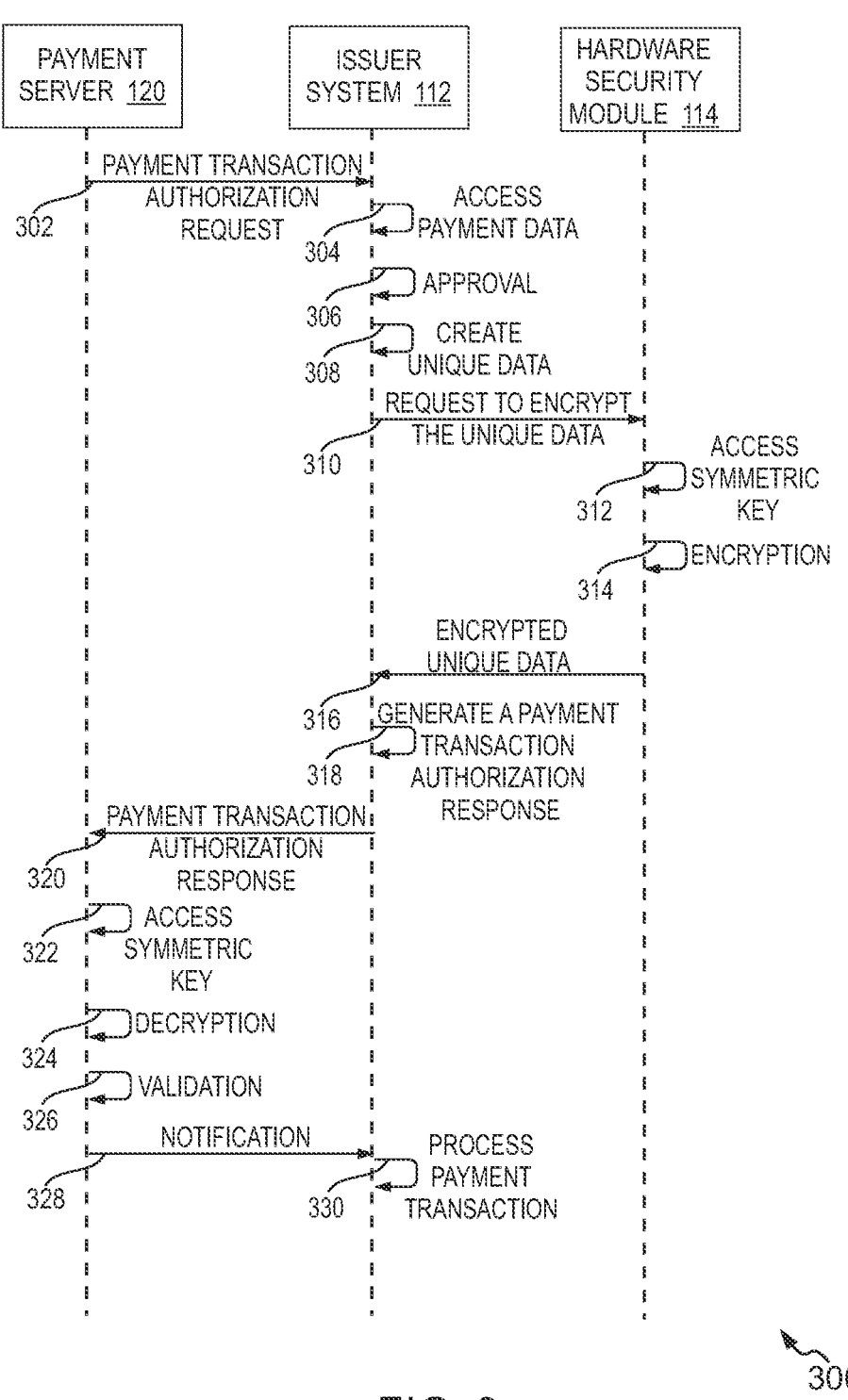
FIG. 3 represents a sequence flow diagram depicting a process flow of performing a payment transaction based on validation of a payment transaction authorization response, in accordance with an example embodiment of the present disclosure.

Referring now to FIG. 3, a sequence flow diagram 300 depicting a process flow of performing a payment transaction based on validation of a payment transaction authorization response is represented, in accordance with an example embodiment of the present disclosure. In an illustrative example scenario, the payment server 120 receives a payment transaction authorization request from the acquirer server 122. The payment server 120 and the acquirer server 122 are described in FIG. 1.

At 302, the payment server 120 sends the payment transaction authorization request to the issuer system 112. The payment transaction authorization request includes payment data that holds details related to the payment transaction. The details may include, but not limited to, a transaction amount (e.g., Rs 50000/–), an authentication data (e.g., PIN) of a user, such as the user 102, a transaction time (e.g., 16:40), a transaction date (e.g., Oct. 6, 2019), a card expiration date (e.g., 30 Dec. 2019), or the like.

At 304, issuer system 112 accesses the payment data upon receipt of the payment transaction authorization request. At 306, the issuer system 112 performs an approval of the payment transaction authorization request. At 308, the issuer system 112 creates a unique data from the payment data upon approval of the payment transaction authorization request. For instance, the unique data includes a plurality of data fields, such as, for example, a transaction amount of Rs 50000/–, a transaction time as 16:40, a transaction date as Oct. 6, 2019 and an expiration date as 30 Dec. 2019. At 310, the issuer system 112 sends a request for encrypting the unique data to the hardware security module (HSM) 114.

At 312, the HSM 114 accesses a symmetric key from a database, such as the database 116 of FIG. 1. The symmetric key is shared with the HSM 114 and the payment server 120 by the issuer system 112. At 314, the HSM 114 encrypts the unique data using the symmetric key. At 316, the HSM 114 sends the encrypted unique data to the issuer system 112.

At 318, the issuer system 112 generates a payment transaction authorization response. At 320, the issuer system 112 sends the payment transaction authorization response to the payment server 120.

At 322, the payment server 120 accesses the symmetric key shared by the issuer system 112. At 324, the payment server 120 decrypts the encrypted unique data using the symmetric key.

At 326, the payment server 120 validates the decrypted unique data by comparing the unique data with corresponding payment data elements received in the payment transaction authorization request. At 328, the payment server 120 sends a notification to the issuer system 112 to process the payment transaction based on successful validation. The validation of the decrypted unique data is explained further in FIG. 5. At 330, the issuer system 112 processes the payment transaction.

In an illustrative example scenario, the user 102 may initiate a payment transaction from a payment terminal, such as the payment terminal 110. In such scenario, the payment terminal 110 may validate the payment transaction authorization response for performing the payment transaction, which is further described with reference to FIG. 4.

Figure 4:
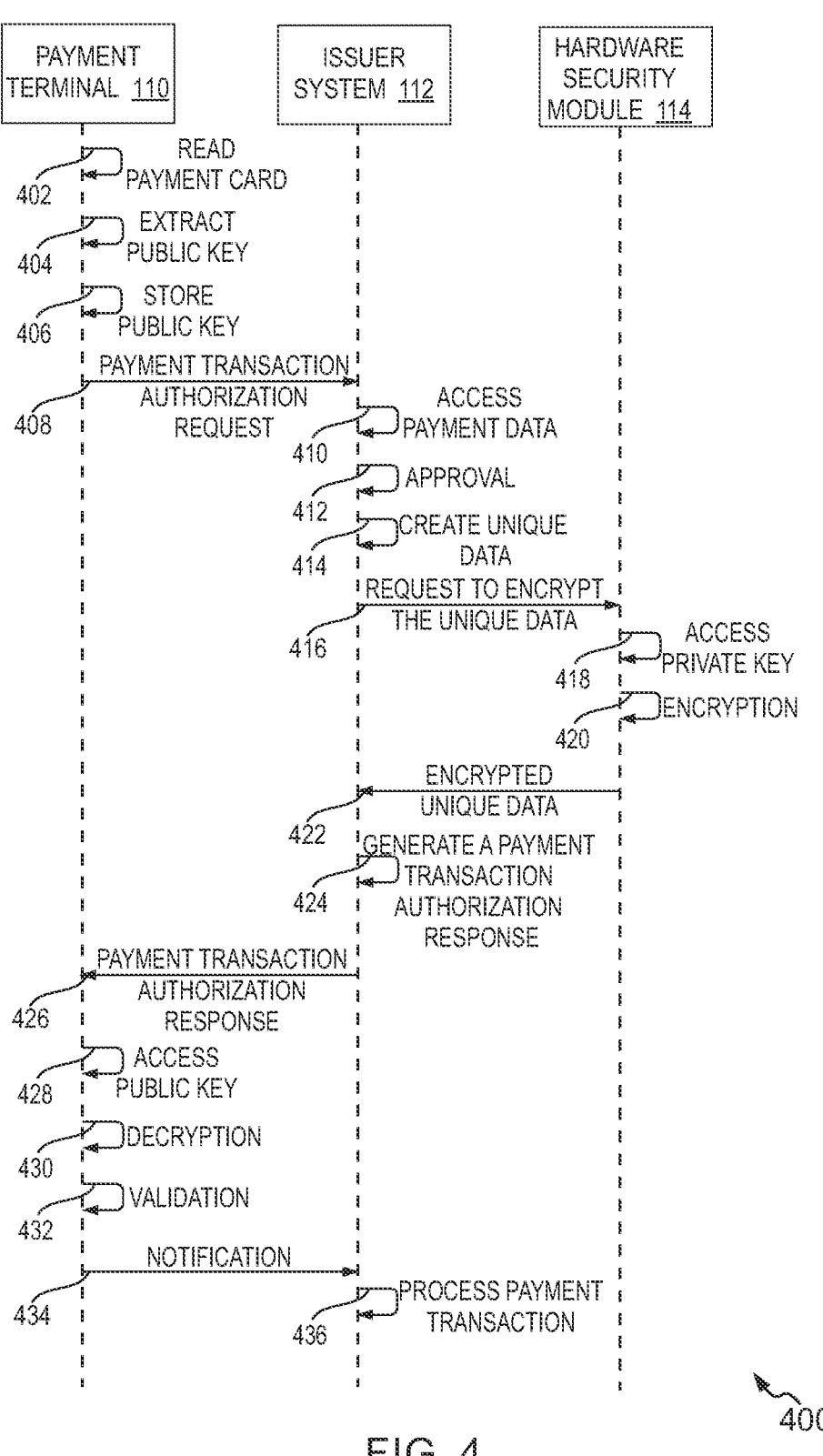
FIG. 4 represents a sequence flow diagram depicting a process flow of performing a payment transaction based on validation of a payment transaction authorization response, in accordance with another example embodiment of the present disclosure.

Referring now to FIG. 4, a sequence flow diagram 400 depicting a process flow of performing a payment transaction based on validation of a payment transaction authorization response is represented, in accordance with another example embodiment of the present disclosure. In an illustrative example scenario, the user 102 uses the payment card 124 for performing the payment transaction. The payment card 124 is dipped/tapped at the payment terminal 110. In an example embodiment, the payment card 124 stores a public key of the issuer system 112. It shall be noted that the payment terminal 110 herein collectively represents a merchant/POS terminal, such as the merchant/POS terminal 108, a credit card terminal, an ATM terminal, or any terminal capable of reading user payment cards for payment transactions.

At 402, the payment terminal 110 reads the payment card 124. At 404, the payment terminal 110 extracts the public key from the payment card 124. At 406, the payment terminal 110 stores the public key. At 408, the payment terminal 110 sends a payment transaction authorization request including payment data to the issuer system 112.

At 410, the issuer system 112 accesses the payment data from the payment transaction authorization request. At 412, the issuer system 112 performs an approval of the payment transaction authorization request. At 414, the issuer system 112 creates the unique data from the payment data. At 416, the issuer system 112 sends a request for encrypting the unique data to the HSM 114.

At 418, the HSM 114 accesses a private key of the issuer system 112. At 420, the HSM 114 encrypts the unique data using the private key. At 422, the HSM 114 sends the encrypted unique data to the issuer system 112.

At 424, the issuer system 112 generates a payment transaction authorization response. The payment transaction authorization response includes at least the encrypted unique data. At 426, the issuer system 112 sends the payment transaction authorization response to the payment terminal 110 via the payment network 118.

At 428, the payment terminal 110 accesses the public key extracted from the payment card 124. At 430, the payment terminal 110 decrypts the encrypted unique data using the public key. At 432, the payment terminal 110 validates the payment transaction authorization response. At 434, the payment terminal 110 sends a notification to the issuer system 112 based on the validation of the payment transaction authorization response. At 436, the issuer system 112 processes the payment transaction.

The validation of the payment transaction authorization response by the payment server 120 and the validation of the payment transaction authorization response by the payment terminal 110 are explained with reference to FIGS. 5 and 6, respectively.

Figure 5:
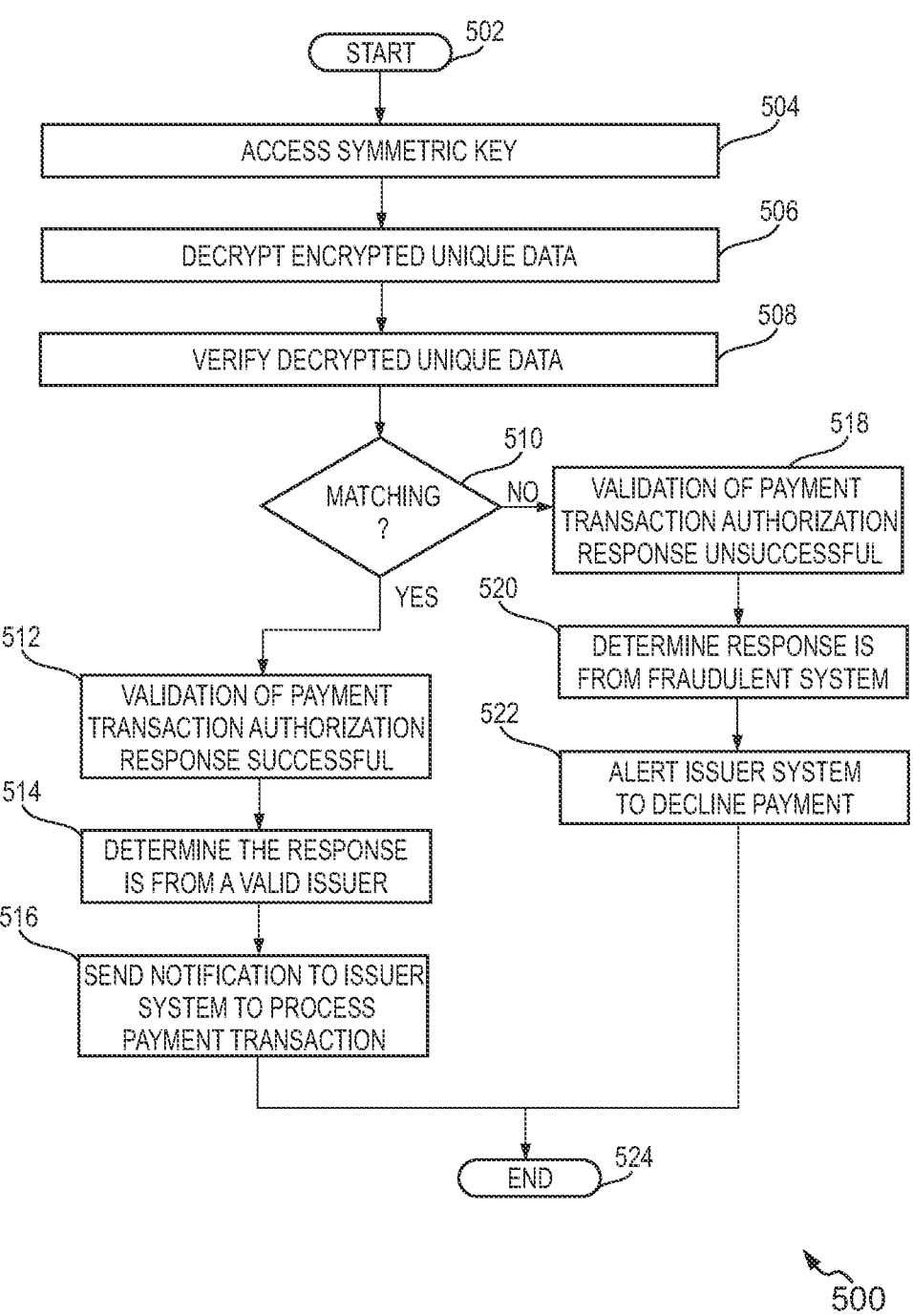
FIG. 5 is a flow diagram depicting validation of the payment transaction authorization response, in accordance with an example embodiment of the present disclosure.

Referring now to FIG. 5, a flow chart 500 depicting the validation of the payment transaction authorization response is shown, in accordance with an example embodiment of the present disclosure. In an example embodiment, the payment transaction authorization response is validated by the payment server 120. The payment server 120 receives the payment transaction authorization response from the issuer system 112 via the payment network 118. The flow chart 500 starts at step 502.

At step 504, the payment server 120 accesses the symmetric key shared by the issuer system 112. At step 506, the payment server 120 decrypts the encrypted unique data included in the payment transaction authorization response using the symmetric key. At step 508, the payment server 120 verifies the decrypted unique data to validate the payment transaction authorization response.

At step 510, the decrypted unique data is compared with the payment data received in the payment transaction authorization request to determine matching between information associated with the unique data and the payment data. In an illustrative example scenario, the decrypted unique data includes the plurality of data fields, such as the transaction amount of Rs 50000/–, the transaction time as 16:40, the transaction date as October 2023 and the card expiration date as 30 Dec. 2019. The payment data includes payment details, but is not limited to, a transaction amount (e.g., Rs 50000/–), an authentication data (e.g., PIN) of a user, such as the user 102, a transaction time (e.g., 16:40), a transaction date (e.g., Oct. 6, 2019), a card expiration date (e.g., 30 Dec. 2019), or the like. If there is a match, proceed to step 512, else proceed to step 518.

At step 512, the payment server 120 validates the payment transaction authorization response successfully upon determining the match. For instance, matching data elements are the transaction amount, the transaction time, the transaction date, and the card expiration date.

At step 514, the payment server 120 determines that the issuer system 112 is a valid issuer, if the unique data matches with original payment data. In other words, the payment transaction authorization response is received from a valid issuer. The original payment data represents payment information comprised in the payment transaction authorization request. At step 516, a notification of the successful validation is sent to issuer system 112 to process the payment transaction.

At step 518, the payment transaction authorization response is not successfully validated, if the unique data does not match with the original payment data.

At step 520, the payment server 120 determines that the payment transaction authorization response is received from a fraudulent system. At step 522, an alert notification is sent to the issuer system 112 for declining the payment transaction. At step 524, the flow chart 500 ends.

As mentioned earlier, the payment transaction authorization response may also be validated by the payment terminal 110, which is shown and described with reference to FIG. 6.

Figure 6:
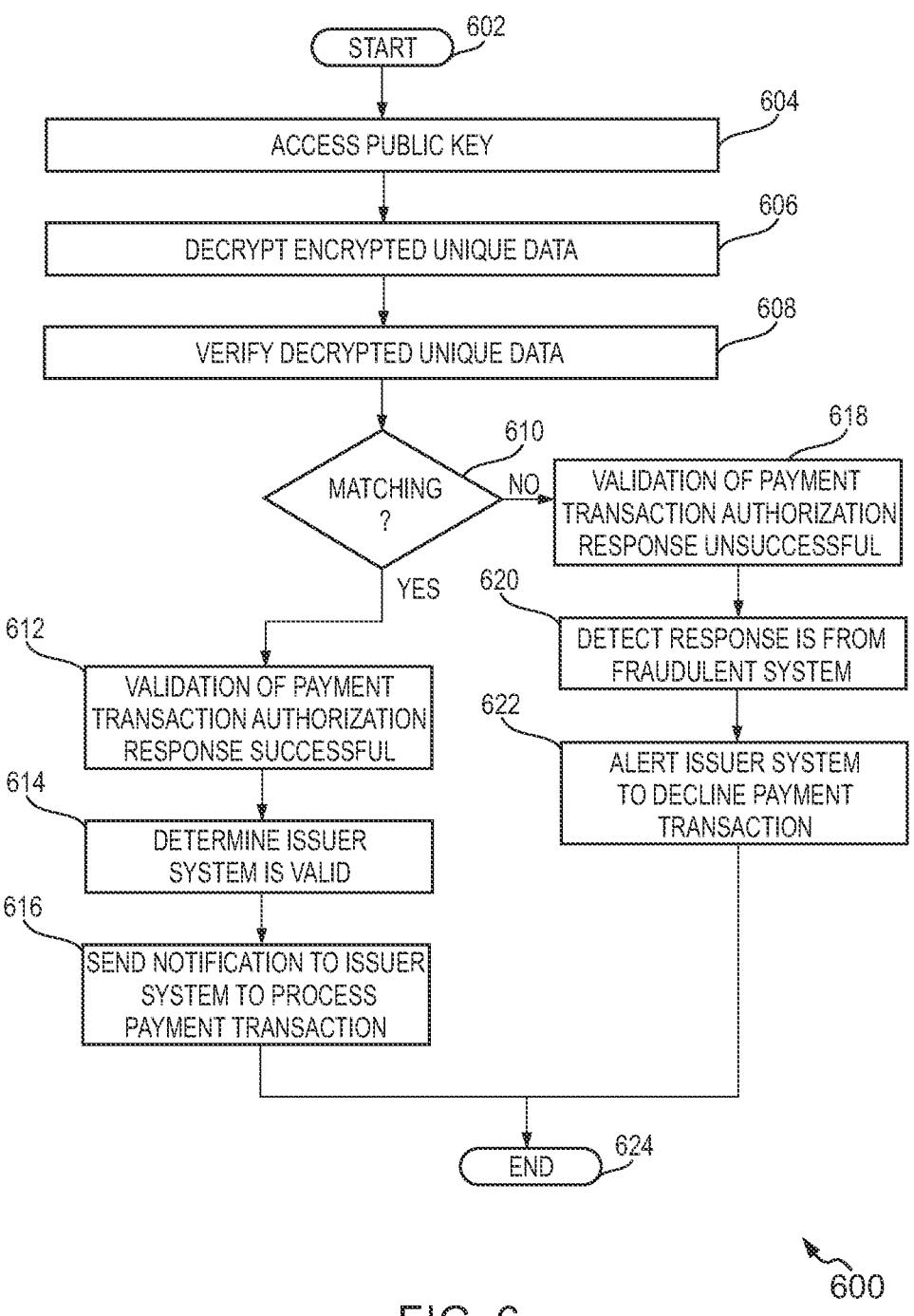
FIG. 6 is a flow diagram depicting validation of the payment transaction authorization response, in accordance with another example embodiment of the present disclosure.

Referring now to FIG. 6, a flow chart 600 depicting validation of the payment transaction authorization response is shown, in accordance with an example embodiment of the present disclosure. The flow chart 600 starts at step 602.

At step 604, the payment terminal 110 accesses the public key captured from the payment card 124. At step 606, the payment terminal 110 decrypts the encrypted unique data using the public key as the decryption key. At step 608, the payment terminal 110 verifies the decrypted unique data to authenticate the payment transaction authorization response.

At step 610, the payment terminal 110 compares the decrypted unique data with the payment data to determine matching between information associated with the unique data and the payment data. If there is a match, proceed to step 612, else proceed to step 618.

At step 612, the payment transaction authorization response is validated successfully based on the successful match. At step 614, the issuer system 112 that provided the payment transaction authorization response is confirmed as a valid issuer. At step 616, a notification of the successful validation is sent to issuer system 112 to process the payment transaction.

At step 618, the payment transaction authorization response is validated unsuccessful if there is no match between the decrypted unique data and the payment data. At step 620, the payment terminal 110 detects that the payment transaction authorization response is from a fraudulent system. At step 622, an alert notification is sent to the issuer system 112 to decline the payment transaction. At step 624, the flow chart 600 ends.

FIG. 7 illustrates a flow diagram depicting a method 700 for performing a payment transaction based on validating a payment transaction authorization response, in accordance with an example embodiment of the present disclosure. The method 700 depicted in the flow diagram may be executed by, for example, the issuer system 112. Operations of the method 700, and combinations of operation in the method 700, may be implemented by, for example, hardware, firmware, a processor, circuitry and/or a different device associated with the execution of software that includes one or more computer program instructions. The method 700 starts at operation 702.

At operation 702, the method 700 includes generating, by an issuer system 112 associated with a payment account of a user 102, a unique data for the payment transaction of the user 102 upon approval of a payment transaction authorization request signal. The issuer system 112 generally determines authenticity of the payment transaction authorization request signal for provisioning the approval. The unique data includes, but not limited to, a transaction amount data, a transaction time data, a transaction date data, card expiration date data and authorization response code data (referring to FIG. 2). In an example embodiment, the issuer system 112 accesses payment data of the payment transaction from the payment transaction authorization request signal for generating the unique data.

At operation 704, the method 700 includes facilitating, by the issuer system 112, an encryption of the unique data using an encryption key. In an embodiment, a request for encrypting the unique data are sent to a hardware security module (HSM) 114. The HSM 114 may be integrated within the issuer system 112 or may be associated with the issuer system 112 (refer FIG. 1). The HSM 114 encrypts the unique data using the encryption key. The encryption key includes one of a symmetric key shared among the HSM 114, the issuer system 112 and the payment network 118 (referring to FIG. 3), and a private key of the issuer system 112 shared with the HSM 114 (referring to FIG. 4).

At operation 706, the method 700 includes sending, by the issuer system 112, a payment transaction authorization response signal to a payment server 120 associated with a payment network 118. The payment transaction authorization response signal includes, but is not limited to, the encrypted unique data. In one embodiment, the encrypted unique data are appended with a response message to generate the payment transaction authorization response signal.

At operation 708, the method 700 includes processing, by the issuer system 112, the payment transaction upon receiving a notification of a successful validation of the payment transaction authorization response signal from the payment server 120 associated with the payment network 118. The validation of the payment transaction authorization response signal is performed by the payment server 120 associated with the payment network 118. The validation includes accessing the encrypted unique data upon receipt of the payment transaction authorization response signal. The payment transaction authorization response signal is validated by the payment server 120 based on matching the decrypted unique data and the payment data received in the payment transaction authorization request.

The sequence of operations of the method 700 need not to be necessarily executed in the same order as they are presented. Further, one or more operations may be grouped together and performed in form of a single step, or one operation may have several sub-steps that may be performed in parallel or in sequential manner.

FIG. 8 illustrates a flow diagram depicting a method 800 for generating a unique data for validating the payment transaction authorization response, in accordance with another example embodiment of the present disclosure. The method 800 depicted in the flow diagram may be executed by, for example, the issuer system 112. Operations of the method 800, and combinations of operation in the method 800, may be implemented by, for example, hardware, firmware, a processor, circuitry and/or a different device associated with the execution of software that includes one or more computer program instructions. The method 800 starts at operation 802.

At operation 802, the method 800 includes generating, by an issuer system associated with a payment account of a user, a unique data for the payment transaction of the user upon approval of a payment transaction authorization request signal. The payment transaction authorization request signal is received from a payment terminal through a payment network for the payment transaction.

At operation 804, the method 800 includes sending, by the issuer system, a request signal for encrypting the unique data using an encryption key to a hardware security module (HSM) 114. The HSM 114 thereafter encrypts the unique data using an encryption key. The encryption key corresponds to one of a symmetric key shared with the HSM, a payment server 120, and a private key shared with the HSM 114.

At operation 806, the method 800 includes sending, by the issuer system 112, a payment transaction authorization response signal to the payment terminal 110 via the payment network 118. The payment transaction authorization response signal includes at least the encrypted unique data.

At operation 808, the method 800 includes processing, by the issuer system 112, the payment transaction upon receiving a notification of a successful validation of a payment transaction authorization response from the payment terminal 110 via the payment network 118. The validation of the payment transaction authorization response signal is performed by the payment terminal 110.

The sequence of operations of the method 800 need not to be necessarily executed in the same order as they are presented. Further, one or more operations may be grouped together and performed in form of a single step, or one operation may have several sub-steps that may be performed in parallel or in sequential manner.

Figure 9:
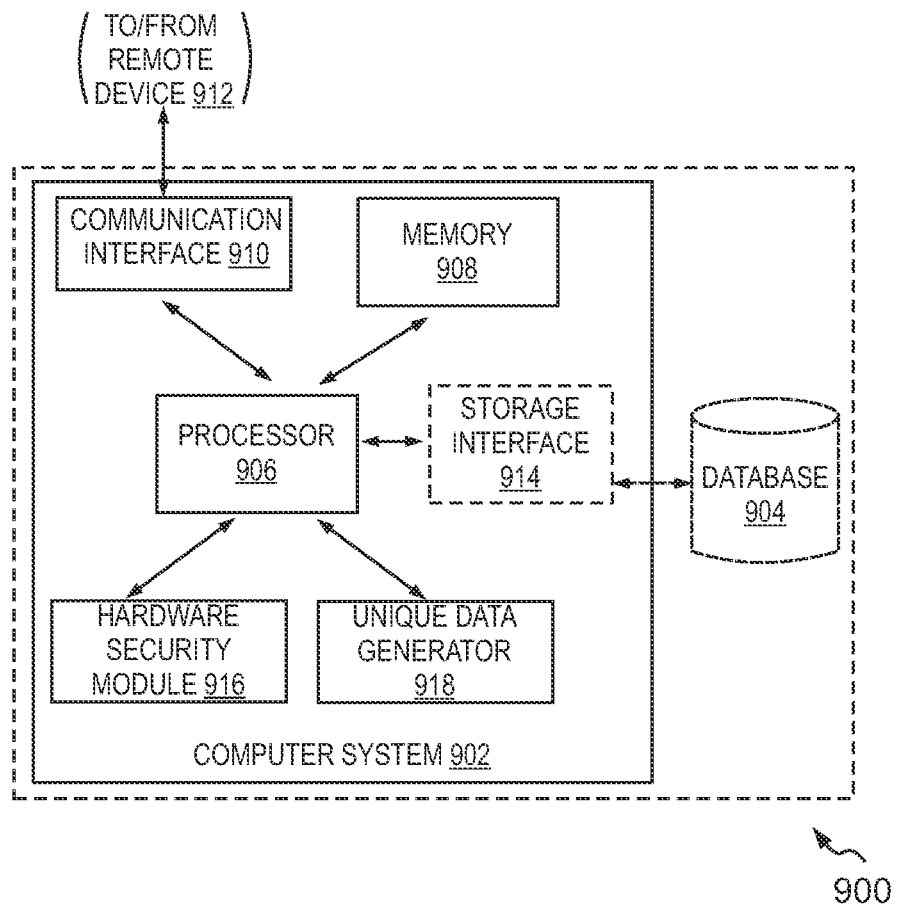
FIG. 9 is a simplified block diagram of an issuer system for generating a unique data for facilitating validation of the payment transaction authorization response, in accordance with an example embodiment of the present disclosure.

FIG. 9 is simplified block diagram of an issuer system 900 for generating a unique data for facilitating validation of the payment transaction authorization response, in accordance with an embodiment of the present disclosure. The issuer system 900 is an example of a server, such as the issuer system 112 shown and described with reference to FIG. 1. The issuer system 900 includes a computer system 902 and a database 904. In an embodiment, the issuer system 900 is integrated in the issuer system 112. The computer system 902 includes at least one processor 906 configured to execute executable instructions for providing various features of the present disclosure. The executing instructions are stored in a memory 908. The components of the computer system 902 provided herein may not be exhaustive and the computer system 902 may include more or fewer components than those depicted in FIG. 9. Further, two or more components may be embodied in one single component, and/or one component may be configured using multiple sub-components to achieve the desired functionalities. Some components of the computer system 902 may be configured using hardware elements, software elements, firmware elements and/or a combination thereof.

The processor 906 is operatively coupled to a communication interface 910 such that the computer system 902 is capable of communicating with a remote device 912 such as the merchant terminal 108, the payment terminal 110, payment server 120 or capable of communicating with any entity connected to the payment network 118 (shown in FIG. 1) or any constituents of the payment network 118. The payment network 118 may be used by the issuer system 112, the payment server 120 and the acquirer server 122 as a payment interchange network. Examples of payment interchange network include, but not limited to, Mastercard® payment system interchange network. Further, the processor 906 is operatively coupled to a hardware security module (HSM) 916 and a unique data generator 918.

In an embodiment, the communication interface 910 is configured to receive a payment transaction authorization request signal from the remote device 912 through the payment network 118. In one scenario, the payment transaction authorization request may be generated by a payment terminal, such as the payment terminal 110 or the merchant terminal 108. The payment terminal 110 sends the payment transaction authorization request to the issuer system 900 via the payment network 118. In another scenario, the payment transaction authorization request may be generated by a payment server, such as the payment server 120. The payment server 120 provides the payment transaction authorization request to the issuer system 900 via the payment network 118. The payment transaction authorization request includes payment data related to the payment transaction. The communication may be achieved through API calls, without loss of generality.

The processor 906 determines authenticity the payment transaction authorization request for approval. After successful approval, the processor 906 accesses payment data for generating a unique data. The processor 906 is communicably coupled with the unique data generator 918. In an embodiment, the unique data generator 918 is configured to generate the unique data based on the payment data. The unique data includes, but not limited to, a transaction amount, a transaction time, a transaction date, card expiration date, and authorization response code (refer FIG. 2). The unique data is provided to the processor 906.

In one example embodiment, the HSM 916 may be integrated within the issuer system 900. In another example embodiment, the HSM 916 may be associated with the issuer system 900. The HSM 916 is configured to store, maintain and manage cryptographic keys and other authentication related data for safeguarding information of users and for providing security in payment transactions. In an example embodiment, the HSM 916 receives a request for encrypting the unique data from the processor 906. For instance, the processor 906 sends an API call for encrypting the unique data to the HSM 916. The HSM 916 encrypts the unique data using an encryption key.

The processor 906 may also be operatively coupled to the database 904. The database 904 is any computer-operated hardware suitable for storing and retrieving data, such as, but not limited to, information of a user, such as the user 102, information related to transaction data generated as part of sales activities conducted over the bankcard network including data relating to merchants, payees, or customers, and purchases. The database 904 may also store information related to a plurality of bank accounts of customers. Each user account data includes at least one of a cardholder name, a cardholder address, an account number, PIN, and other account identifier. The database 904 may also include instructions for settling transactions including merchant bank account information. The database 904 may include multiple storage units such as hard disks and/or solid-state disks in a redundant array of inexpensive disks (RAID) configuration. The database 904 may include a storage area network (SAN) and/or a network attached storage (NAS) system.

In some embodiments, the database 904 is integrated within computer system 902. For example, the computer system 902 may include one or more hard disk drives as the database 904. In other embodiments, the database 904 is external to the computer system 902 and may be accessed by the computer system 902 using a storage interface 914. The storage interface 914 is any component capable of providing the processor 906 with access to the database 904. The storage interface 914 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 906 with access to the database 904.

In one example embodiment, if the payment transaction authorization request is from the payment server 120, the HSM 916 uses a symmetric key for the encryption. The symmetric key is shared by the issuer system 900 to the HSM 916. In another example embodiment, if the payment transaction authorization request is from the payment terminal 110, then the HSM 916 uses a private key of the issuer system 900 for the encryption. After the encryption, the HSM 916 generates the encrypted unique data. The encrypted unique data are provided to the processor 906. The processor 906 appends the encrypted unique data to a payment transaction authorization response. The payment transaction authorization response is sent to the remote device 912 (e.g., the payment terminal 110 or the merchant terminal 108) via the communication interface 910.

The encrypted unique data is decrypted by the remote device 912. In one example embodiment, the payment server 120 decrypts the encrypted unique data using the symmetric key as the decryption key. In another example embodiment, the payment terminal 110 decrypts the encrypted unique data using a public key as the decryption key. The public key is captured from the payment card 124 of a user, when the payment card 124 is dipped or tapped at the payment terminal 110. The remote device 912 then validates the payment transaction authorization response by determining matching between the decrypted unique data and the payment data. The remote device 912 then sends a notification to the issuer system 900 based on the validation. In case of a successful validation, the remote device 912 sends a notification to the issuer system 900 to process the payment transaction. In case of an unsuccessful validation, the remote device 912 sends an alert notification to the issuer system 900 to decline the payment transaction.

Via the communication interface 910, the processor 906 receives the notification from the remote device 912. The issuer system 900 processes the payment transaction based on the notification. In case of receiving the alert notification via the communication interface 910, the processor 906 declines the payment transaction.

Figure 10:
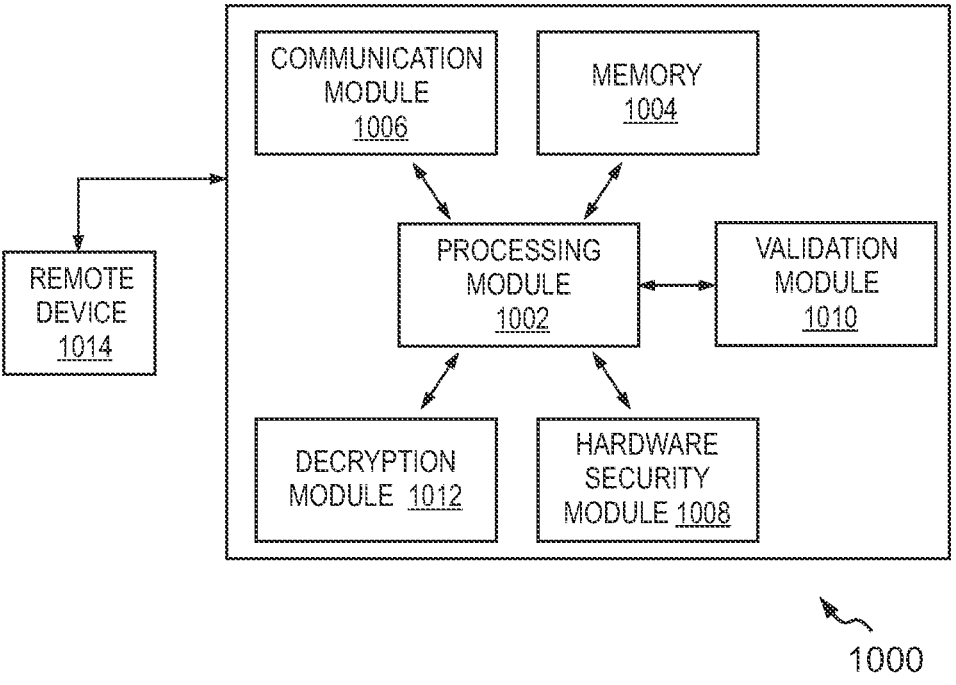
FIG. 10 is a simplified block diagram of a payment server for the validation of the payment transaction authorization response, in accordance with an example embodiment of the present disclosure.

FIG. 10 is a simplified block diagram of a payment server 1000 for the validation of the payment transaction authorization response, in accordance with an embodiment of the present disclosure. The payment server 1000 is an example of the payment server 120 of FIG. 1. The payment server 1000 includes a processing module 1002 operatively coupled to a memory 1004, a communication module 1006, a hardware security module (HSM) 1008, a validation module 1010 and a decryption module 1012. The processing module 1002 is configured to extract programming instructions from a memory 1004 to provide various features of the present disclosure. Additionally, the memory 1004 stores instructions for decrypting an encrypted unique data and validating a payment transaction authorization response, that are executed by the processing module 1002. The components of the payment server 1000 provided herein may not be exhaustive and the payment server 1000 may include more or fewer components than those depicted in FIG. 10. Further, two or more components may be embodied in one single component, and/or one component may be configured using multiple sub-components to achieve the desired functionalities. Some components of the payment server 1000 may be configured using hardware elements, software elements, firmware elements and/or a combination thereof.

Initially, the communication module 1006 receives a payment transaction authorization request from a remote device 1014, e.g., the acquirer server 122. After receiving the payment transaction authorization request, the processing module 1002 sends a payment transaction authorization request signal for the payment transaction to the remote device 1014, such as the issuer system 900 via the communication module 1006 through the payment network 118. The payment transaction authorization request signal includes payment data related to the payment transaction. The communication module 1006 further receives a payment transaction authorization response from the issuer system 900. The payment transaction authorization response includes at least an encrypted unique data. The encrypted unique data includes encrypted data corresponding to a transaction amount, a transaction time, a transaction date, a payment card expiration date, and authorization response code data.

The HSM 1008 is configured to store, maintain and manage cryptographic keys and other authentication related data for safeguarding information of users and for providing security in payment transactions. Moreover, the HSM 1008 is configured to store a symmetric key, which is shared with the issuer system 900. In an example embodiment, the HSM 1008 is integrated within the payment server 1000. The HSM 1008 is configured to decrypt the encrypted unique data and provide the decrypted unique data to the processing module 1002. In another example embodiment, the HSM 1008 may be associated with the payment server 1000. The processing module 1002 provides the symmetric key to the decryption module 1012. The decryption module 1012 is configured to decrypt the encrypted unique data using the decryption key. The decrypted unique data is provided to the processing module 1002.

The processing module 1002 provides the decrypted unique data to the validation module 1010. The validation module 1010 is configured to validate the payment transaction authorization response. In an example embodiment, the validation module 1010 determines a match between the decrypted unique data and the payment data for determining validation. If there is a match, the validation module 1010 invokes the processing module 1002 to send a notification to the remote device 1014 for processing the payment transaction. For instance, the notification is sent to the issuer system 900 via the communication module 1006. If there is no match, the validation module 1010 invokes the processing module 1002 to send an alert notification to the remote device 1014 for declining the payment transaction. The alert notification is sent to the issuer system 900 via the communication module 1006.

Figure 11:
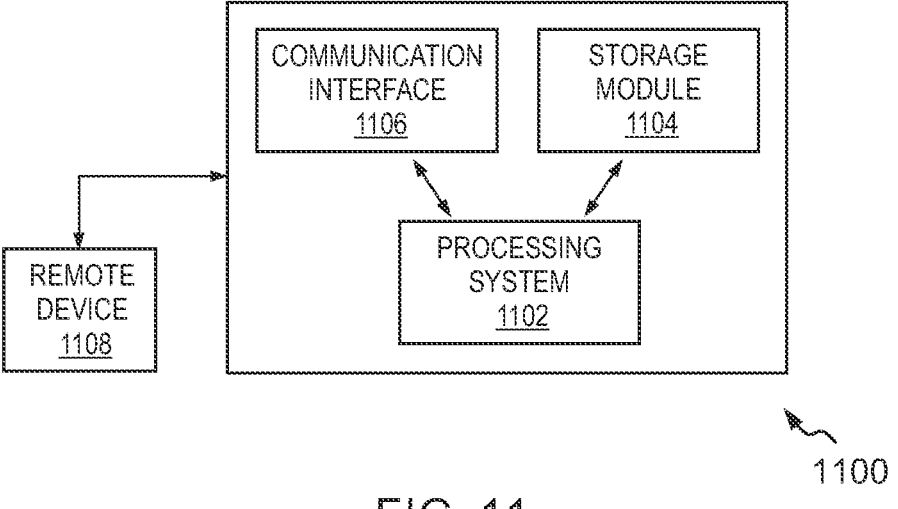
FIG. 11 is a simplified block diagram of an acquirer server, in accordance with an example embodiment of the present disclosure.

FIG. 11 is a simplified block diagram of an acquirer server 1100, in accordance with an embodiment of the present disclosure. The acquirer server 1100 is an example of the acquirer server 122 of FIG. 1. The acquirer server 1100 is associated with an acquirer bank/acquirer, in which a user (e.g., the merchant 106) may have a payment account. The acquirer server 1100 includes a processing system 1102 operatively coupled to a storage module 1104 and a communication interface 1106. The components of the acquirer server 1100 provided herein may not be exhaustive and the acquirer server 1100 may include more or fewer components than those depicted in FIG. 11. Further, two or more components may be embodied in one single component, and/or one component may be configured using multiple sub-components to achieve the desired functionalities. Some components of the acquirer server 1100 may be configured using hardware elements, software elements, firmware elements and/or combination thereof.

The storage module 1104 is configured to store machine executable instructions to be accessed by the processing system 1102. Additionally, the storage module 1104 stores information related to, contact information of the merchant, bank account number, availability of funds in the account, payment card details, transaction details and/or the like.

The processing system 1102 is configured to communicate with one or more remote devices such as a remote device 1108 using the communication interface 1106 over a network, such as the payment network 118 of FIG. 1. The examples of the remote device 1108 include the payment server 120 or other computing systems of acquirer and the payment network 118 and the like. The communication interface 1106 is capable of facilitating such operative communication with the remote devices and cloud servers using API (Application Program Interface) calls. The processing system 1102 receives a payment card information, a payment transaction amount, a customer information and merchant information from the remote device 1108 (i.e. the payment terminal 110) via the communication interface 1106. The communication interface 1106 is also configured to transfer the payment transaction authorization request to the remote device 1108, i.e., the payment server 120. In an example embodiment, the communication interface 1106 receives a transaction amount for the payment transaction provided by the issuer system 112 via the payment server 120. The processing system 1102 adds the payment amount in a payment account of a merchant, such as the merchant 106.

Figure 12:
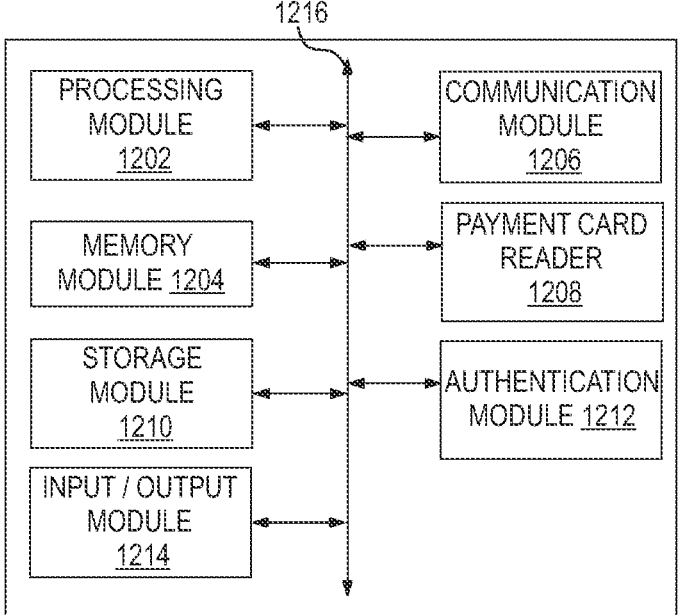
FIG. 12 shows a simplified block diagram of a payment terminal capable of implementing the various embodiments of the present disclosure.

FIG. 12 shows a simplified block diagram of a payment terminal 1200 capable of implementing the various embodiments of the present disclosure. The payment terminal 1200 is an example of the merchant/POS terminal 108 or payment terminal 110, such as an ATM terminal or the like. It should be understood that the payment terminal 1200 as illustrated and hereinafter described is merely illustrative of one type of device and should not be taken to limit the scope of the embodiments. As such, it should be appreciated that at least some of the components described below in connection with the payment terminal 1200 may be optional and thus an example embodiment may include more, less or different components than those described in connection with the example embodiment of the FIG. 12.

The illustrated payment terminal 1200 includes a processing module 1202 (e.g., a signal processor, microprocessor, ASIC, or other control and processing logic circuitry) for performing such tasks as signal coding, data processing, input/output processing, and/or other functions. The illustrated payment terminal 1200 also includes a memory module 1204 that stores executable instructions to be executed by the processing module 1202. Further, the payment terminal 1200 also includes a communication module 1206, a payment card reader 1208, a storage module 1210, an authentication module 1212 and an input/output (I/O) module 1214. The components of the payment terminal 1200 provided herein may not be exhaustive and the payment terminal 1200 may include more or fewer components than those depicted in FIG. 12. Further, two or more components may be embodied in one single component, and/or one component may be configured using multiple sub-components to achieve the desired functionalities. Some components of the payment terminal 1200 may be configured using hardware elements, software elements, firmware elements and/or a combination thereof.

In an embodiment, the payment card reader 1208 is configured to read a payment card 124 of a user, i.e., the user 102. When the payment card 124 is dipped/tapped at the payment terminal 1200, the payment card reader 1208 extracts a public key stored in the payment card 124. The public key is stored in the storage module 1210. After the payment card 124 is read, the payment terminal 1200 receives one or more inputs provided by a user, such as the user 102 or the merchant 106.

In an embodiment, the input/output module 1214 may include mechanisms configured to receive inputs from and provide outputs to a merchant, such as the merchant 106. To that effect, the I/O module 1214 may include at least one input interface and/or at least one output interface. Examples of the input interface may include, but are not limited to, a keypad, a touch screen, soft keys, a microphone, and the like. Examples of the output interface may include, but are not limited to, a display such as a light emitting diode display, a thin-film transistor (TFT) display, a liquid crystal display, an active-matrix organic light-emitting diode (AMOLED) display, a microphone, a speaker, a ringer, a vibrator, and the like. In an example embodiment, the I/O module 1214 is configured to receive one or more inputs from a user, such as a payment amount, a password, a PIN, and/or the like. The one or more inputs are provided to the processing module 1202.

In an embodiment, the processing module 1202 is capable of communicating with a server, such as the acquirer server 1100 (e.g., the acquirer server 122), the payment server 1000 (e.g., the payment server 120), the issuer system 900 (e.g., the issuer system 112) via the payment network 118 or it communicates with any entity within the payment network 118. The processing module 1202 sends the payment transaction authorization request and a payment data to the payment network 118 via the communication module 1206. The payment data includes, but not limited to, a transaction amount, a transaction time, a transaction date, a user identifier, an encrypted password of the user, and/or the like. The payment data is stored in the storage module 1210.

Further, the communication module 1206 receives a payment transaction authorization response from the issuer system 900 in response to the payment transaction authorization request. The payment transaction authorization response includes an encrypted unique data generated by the issuer system 900. In an embodiment, the authentication module 1212 decrypts the encrypted unique data using the public key associated with the issuer system 900. The authentication module 1212 accesses the public key from the storage module 1210. After the decrypting the received unique data, the authentication module 1212 accesses the payment data from the storage module 1210. The authentication module 1212 then determines a match between the decrypted unique data and the payment data for authenticating the payment transaction authorization response.

The processing module 1202 determines if the issuer system 900 is a valid issuer based on a successful match. The processing module 1202 sends a notification to the issuer system 900 via the communication module 1206 to process the payment transaction.

When there is no match, the processing module 1202 determines that the payment transaction authorization response is not from a valid issuer. In other words, the processing module 1202 detects that the payment transaction authorization response is from a fraudulent system/sender. The processing module 1202 sends an alert notification to the issuer system 900 to decline the payment transaction upon detecting the fraudulent system.

Moreover, the various components of the payment terminal 1200, such as the processing module 1202, the memory module 1204, the communication module 1206, the payment card reader 1208, the storage module 1210, the authentication module 1212 and the I/O module 1214 may be configured to communicate with each other via or through a centralized circuit system 1216. The centralized circuit system 1216 may be various devices configured to, among other things, provide or enable communication among the components (1202-1214) of the payment terminal 1200. In certain embodiments, the centralized circuit system 1216 may be a central printed circuit board (PCB) such as a motherboard, a main board, a system board, or a logic board. The centralized circuit system 1216 may also, or alternatively, include other printed circuit assemblies (PCAs) or communication channel media. In some embodiments, the centralized circuit system 1216 may include appropriate storage interfaces to facilitate communication among the components (1202-1214). Some examples of the storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the payment terminal 1200 with access to the data stored in a memory (not shown in FIG. 12).

Without limiting the scope of the present disclosure, the one or more example embodiments disclosed herein provide methods and systems for performing a payment transaction based on the validation that a payment transaction authorization response is from a valid issuer. The payment transaction authorization response is validated based on a unique data generated by the issuer. The unique data is generated based on a payment data in a payment transaction authorization request. Further, the unique data is encrypted using an encryption key, such as a symmetric key commonly shared with the issuer and a hardware security module or a private key of the issuer. The encrypted unique data cannot be intercepted or reproduced by a fraudulent system or a malware. The encrypted unique data may be decrypted by a payment terminal and a payment server using a decryption key, such as a public key captured from a payment card of a user and the symmetric key shared between the issuer and the payment server, respectively. Thus, the payment terminal or the payment server is capable of identifying a possible fraud attack based on determining a match between the decrypted unique data and the payment data. When there is no match, then it is inferred that the payment transaction authorization response is not from the valid issuer but from the fraudulent system/sender. Thus, the payment transaction is declined upon identifying the fraudulent system. This prevents a fraudulent payment transaction.

The disclosed methods with reference to FIGS. 1 to 12, or one or more operations of the method 700 and the method 800 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components)) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means includes, for example, the Internet, the World Wide Web, an intranet, software applications, cable (including fiber optic cable), magnetic communications, electromagnetic communications (including RF, microwave, and infrared communications), electronic communications, or other such communication means.

Although the disclosure has been described with reference to specific exemplary embodiments, it is noted that various modifications and changes may be made to these embodiments without departing from the broad spirit and scope of the disclosure. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

Particularly, the issuer system 900 (e.g., issuer system 112) and its various components such as the computer system 902 and the database 904 may be enabled using software and/or using transistors, logic gates, and electrical circuits (for example, integrated circuit circuitry such as ASIC circuitry). Various embodiments of the disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

We claim:

1. A computer-implemented method for performing a payment transaction, the computer-implemented method comprising:

generating, by an issuer system associated with a payment account of a user, a unique data for the payment transaction of the user upon approval of a payment transaction authorization request signal, the payment transaction authorization request signal including payment data associated with the payment transaction and being received from a payment terminal through a payment network for the payment transaction;

sending, by the issuer system, a request signal for encrypting the unique data using an encryption key to a hardware security module (HSM) comprising a database, the encryption key corresponding to one of a symmetric key shared with the HSM and a private key shared with the HSM;

accessing, via the HSM, the encryption key from the database based on the payment transaction authorization request signal being received from the payment terminal;

encrypting, via the HSM, the unique data using the accessed encryption key, thereby generating the encrypted unique data;

receiving, by the issuer system, the encrypted unique data from the HSM;

appending, by the issuer system, the encrypted unique data to a payment transaction authorization response signal;

sending, by the issuer system, the payment transaction authorization response signal to the payment terminal via the payment network, the payment transaction authorization response signal comprising at least the encrypted unique data;

validating, by the payment terminal, the payment transaction authorization response signal by— accessing the encrypted unique data upon receipt of the payment transaction authorization response signal from the issuer system;

accessing a public key of the issuer system, the public key extracted from a payment card of the user presented at the payment terminal;

decrypting the encrypted unique data using the public key;

validating the payment transaction authorization response based on matching the decrypted unique data and the payment data; and transmitting, to the issuer system, a notification of a successful validation of the payment transaction authorization response signal; and processing, by the issuer system, the payment transaction upon receiving the notification of a successful validation of the payment transaction authorization response signal from the payment terminal via the payment network.

2. The method as claimed in claim 1, wherein the unique data comprises at least a transaction amount data, a transaction time data, a transaction date data, card expiration date data, and authorization response code data.

3. The method as claimed in claim 1, further comprising transmitting, by the payment terminal to the issuer system, a notification of a successful validation of the payment transaction authorization response signal.

4. The method as claimed in claim 3, further comprising receiving, by the issuer system, the notification from the payment terminal.

5. The method as claimed in claim 1, further comprising:

reading, via the payment terminal, a payment card of the user;

extracting a public key of the issuer system from the payment card; and storing the public key of the issuer system in a memory module of the payment terminal.

6. The method as claimed in claim 5, further comprising transmitting, to the issuer system by the payment terminal, the payment transaction authorization request signal.

7. The method as claimed in claim 6, further comprising:

accessing, by the issuer system, the payment data of the payment transaction from the payment transaction authorization request signal; and performing approval of the payment transaction authorization request signal by the issuer system.

8. A system for performing a secure payment transaction, the system comprising:

an issuer system associated with a payment account of a user, the issuer system comprising:

a hardware security module (HSM) comprising a database;

a first memory comprising first stored instructions; and an issuer processor; and a payment terminal comprising:

a second memory comprising second stored instructions; and a payment terminal processor, said issuer processor configured to execute the first stored instructions to cause the issuer processor to:

generate a unique data for the payment transaction of the user upon approval of a payment transaction authorization request signal, the payment transaction authorization request signal including payment data associated with the payment transaction and being received from the payment terminal through a payment network for the payment transaction;

send a request signal for encrypting the unique data using an encryption key to the HSM, the encryption key corresponding to one of a symmetric key shared with the HSM and a private key shared with the HSM;

access, via the HSM, the encryption key from the database based on the payment transaction authorization request signal being received from the payment terminal;

encrypt, via the HSM, the unique data using the accessed encryption key, thereby generating the encrypted unique data;

receive the encrypted unique data from the HSM;

append the encrypted unique data to a payment transaction authorization response signal;

send the payment transaction authorization response signal to the payment terminal via the payment network, the payment transaction authorization response signal comprising at least the encrypted unique data; and process the payment transaction upon receiving a notification of a successful validation of the payment transaction authorization response signal from the payment terminal via the payment network; and said payment terminal processor configured to execute the second stored instructions to cause the payment terminal processor to:

access the encrypted unique data upon receipt of the payment transaction authorization response signal from the issuer system;

access a public key of the issuer system, the public key extracted from a payment card of the user presented at the payment terminal;

decrypt the encrypted unique data using the public key;

validate the payment transaction authorization response based on matching the decrypted unique data and the payment data; and transmit, to the issuer system, the notification of a successful validation of the payment transaction authorization response signal.

9. The system as claimed in claim 8, wherein the unique data comprises at least a transaction amount data, a transaction time data, a transaction date data, card expiration date data, and authorization response code data.

10. The system as claimed in claim 8, said issuer processor configured to execute the first stored instructions to cause the issuer processor to receive the notification from the payment terminal.

11. The system as claimed in claim 8, said payment terminal processor configured to execute the second stored instructions to cause the payment terminal processor to:

read a payment card of the user;

extract a public key of the issuer system from the payment card; and store the public key of the issuer system in the second memory of the payment terminal.

12. The system as claimed in claim 11, said payment terminal processor configured to execute the second stored instructions to cause the payment terminal processor to transmit, to the issuer system, the payment transaction authorization request signal.

13. The system as claimed in claim 12, said issuer processor configured to execute the first stored instructions to cause the issuer processor to:

access the payment data of the payment transaction from the payment transaction authorization request signal; and perform approval of the payment transaction authorization request signal.

* * * * *